US 6,646,056 B2

(12) United States Patent
Zhao et al.

(10) Patent No.: US 6,646,056 B2
(45) Date of Patent: Nov. 11, 2003

(54) THERMOPLASTIC ELASTOMER COMPOSITIONS

(75) Inventors: Xia Zhao, Coppell, TX (US); Hoan Tran, Arlington, TX (US); Charles G. Reid, Southlake, TX (US)

(73) Assignee: Solvay Engineered Polymers, Grand Prairie, TX (US)

( * ) Notice: Subject to any disclaimer, the term of this patent is extended or adjusted under 35 U.S.C. 154(b) by 81 days.

(21) Appl. No.: 09/978,126

(22) Filed: Oct. 16, 2001

(65) Prior Publication Data

US 2003/0092846 A1 May 15, 2003

(51) Int. Cl.[7] .................... C08L 9/00; C08L 23/00; C08F 4/28
(52) U.S. Cl. .................. 525/243; 524/491; 524/523; 524/525; 525/222; 525/232
(58) Field of Search .................. 524/523, 525; 525/222, 232, 243; 526/227

(56) References Cited

U.S. PATENT DOCUMENTS

| 3,758,643 A | 9/1973 | Fischer .................. 260/897 A |
| 3,806,558 A | 4/1974 | Fischer .................. 260/897 A |
| 4,130,535 A | 12/1978 | Coran et al. ......... 260/33.6 AQ |
| 4,311,628 A | 1/1982 | Abdou-Sabet et al. ..... 260/33.6 AQ |
| 4,323,528 A | 4/1982 | Collins .................. 264/53 |
| 4,454,092 A | 6/1984 | Shimizu et al. ............ 264/349 |
| 5,206,294 A | 4/1993 | Dawson .................. 525/196 |
| 5,508,318 A | 4/1996 | Comer .................. 522/112 |
| 5,569,717 A | 10/1996 | Lambla et al. ............. 525/193 |
| 5,650,468 A | 7/1997 | Vandevijver et al. ....... 525/285 |
| 6,087,431 A | 7/2000 | Uchida et al. ............ 524/490 |
| 6,207,746 B1 * | 3/2001 | Uchida et al. |
| 6,433,089 B1 * | 8/2002 | Nishihara et al. |

FOREIGN PATENT DOCUMENTS

WO   WO 98/32795   7/1998

OTHER PUBLICATIONS

Graebling, D.; Lambla, M.; Wautier H., "PP/PE Blends by Reactive Extrusion: PP Rheological Behavior Changes," *Journal of Applied Polymer Science*, vol. 66, No. 5, pp. 809–819, 1997.

* cited by examiner

*Primary Examiner*—Tae H. Yoon
(74) *Attorney, Agent, or Firm*—Winston & Strawn LLP

(57) ABSTRACT

The invention relates to polymer compositions useful as thermoplastic elastomers for extrusion, calendering, blow molding, thermoforming, and foam processing, and to articles made therefrom. Such improved melt strength thermoplastic elastomers include a blend of propylenic resin (A) and ethylenic elastomer (B), wherein the (A) resin is partially branched and/or the (B) elastomer is partially crosslinked by the addition of multifunctional acrylic monomer (C) containing at least three acrylate groups.

21 Claims, 3 Drawing Sheets

THERMOPLASTIC ELASTOMER COMPOSITIONS

FIELD OF INVENTION

This invention relates to thermoplastic elastomer compositions including blends of propylene and ethylene polymers for extrusion, calendering, blow molding, thermoforming, and foam processing, and articles made therefrom.

BACKGROUND OF THE INVENTION

There is a need for recyclable materials that can be used as alternatives to polyvinyl chloride for the fabrication of articles. Polyvinyl chloride, often used with a plasticizer, can be formed into a rubbery, thin sheet for use as a skin layer over a rigid or soft substrate. Due to the combination of the tactile feel (softness) and the melt strength during processing, plasticized polyvinyl chloride can be a very desirable material. Polyvinyl chloride, however, is not easily recyclable or melt blendable with non-polar polymers, which has limited the utility of polyvinyl chloride to applications where recyclability is not desired. Recyclable materials with processing characteristics similar to polyvinyl chloride, such as high melt strength, are being actively sought.

Olefinic polymers, as a class of materials, offer the capability to be recycled with very little loss of physical properties due to the high level of hydrocarbon saturation. In order to achieve a soft tactile feel similar to cured animal leather or polyvinyl chloride sheets in a recyclable product, several thermoplastic polyolefin technologies have been developed.

Olefinic thermoplastic elastomers including thermoplastic olefin blends (TPO), thermoplastic polymer alloy compositions, and dynamically vulcanized thermoplastic elastomers have been explored for such applications.

A thermoplastic elastomer (TPE) is a material that exhibits rubber-like characteristics, yet may be melt processed with most thermoplastic processing equipment, such as by extrusion. The rubber-like characteristics typically desired are high extensibility, mechanical recovery, resiliency, and low temperature ductility. An olefinic thermoplastic elastomer includes primarily polymers manufactured by the polymerization of at least 50 mole percent olefinic monomers, such as ethylene, propylene, butylene, isobutylene, alpha-olefins, olefinic dienes, and the like.

Physical blends of thermoplastic polyolefins are commercially available as recyclable alternatives to plasticized polyvinyl chloride. One such material, DEXFLEX® E280, commercially available for thin sheet extrusion from Solvay Engineered Polymers of Auburn Hills, Mich., is prepared by melt blending polypropylene with high molecular weight ethylene-propylene rubbers. This and other similar materials are often referred to as flexible thermoplastic olefins (f-TPO). The advantages relative to polyvinyl chloride are low temperature ductility, weatherability, higher temperature service, and comparable cost per volume. The family of most melt-blended f-TPO products, however, tends to have a lower melt strength for high temperature processing, e.g., high speed sheet extrusion, calendering, thermoforming, blow molding, and foaming.

A polymer blend that includes an irradiated partially crystalline polyolefin with high melt strength and a non-irradiated polyolefin is disclosed in U.S. Pat. No. 5,508,318. This composition exhibits many desirable characteristics for extruded thin sheets, but has the disadvantage of higher cost due to the electron beam irradiation process and the subsequent number of melt blending steps required to achieve the desired material by incorporation of other raw materials and ingredients.

One family of thermoplastic polymer alloy compositions can be prepared from blends of polypropylene, ethylene copolymer ionomer resin, ethylene glycidyl acrylate or methacrylate copolymer, and uncrosslinked ethylene propylene rubber, such as are disclosed in U.S. Pat. No. 5,206,294. The reaction of the epoxide group with the acrylic acid group creates a partially crosslinked network that results in a material with improved melt strength and desirable physical properties. A product similar to this is available commercially as DEXFLEX® E250 from Solvay Engineered Polymers of Auburn Hills, Mich. This technology tends to be more expensive due to the specialty ethylene-based copolymers that are produced with a high pressure reaction process. Also, these materials tend to exhibit an undesirable high surface gloss when extruded in sheets, which gloss requires additional processing to be removed.

Thermoplastic elastomers called dynamically vulcanized alloys (DVAs) can be prepared through the process of dynamic vulcanization, such as that described in U.S. Pat. Nos. 3,758,643 and 3,806,558. Using this process, an elastomer can be crosslinked during melt mixing with a rigid thermoplastic polyolefin to yield a material that is melt processable, yet exhibits characteristics similar to thermoset elastomers. Compositions obtained with this process are micro-gel dispersions of cured elastomer in an uncured matrix of thermoplastic polymer. Commercial olefinic thermoplastic elastomer materials that use this technology of dynamic vulcanization are well known and are disclosed in U.S. Pat. Nos. 4,130,535 and 4,311,628. The materials disclosed in these patents are commercially known as SANTOPRENE® and utilize a phenolic resin to crosslink the olefin elastomer phase. The SANTOPRENE® materials are melt processable and can be extruded into profiles such as sheets. They also tend to exhibit high melt strength, but have very little ductility and draw, which reduces the utility of the material technology for processing applications such as thermoforming, blow molding, and foaming.

The use of organic peroxide to crosslink the elastomer phase in an olefinic-based DVA is well known to those of ordinary skill in the art. For example, U.S. Pat. No. 3,758,643 discloses that peroxide 2,5-bis(t-butylperoxy)-2,5-dimethylhexane at a concentration of 0.05 to 0.4 weight percent is useful for crosslinking the elastomer phase in the olefinic DVA. The use of peroxide alone, however, can be detrimental to the high molecular weight polypropylene due to the beta-scission that occurs and results in a very low molecular weight for the thermoplastic phase. The consequences of this degradation include lower melt strength and poor solid-state mechanical properties.

U.S. Pat. No. 4,454,092 discloses a process for the single-step manufacture of an olefinic-based DVA in which the elastomer is crosslinked with organic peroxide at a concentration of 0.3 weight percent. To minimize the adverse consequences of organic peroxide upon the thermoplastic polypropylene, the free radical crosslinking aid, divinyl benzene, is used as a co-agent at a concentration of 0.5 weight percent. The relatively high organic peroxide content disclosed here tends to cause significant chain scission of the polypropylene, thereby leading to lower viscosity (or higher melt flow rate) and a resulting loss in melt strength properties.

International Patent application No. WO 98/32795 discloses that a thermoplastic elastomer can be prepared from a blend of ethylene-octene elastomer and polypropylene when rheologically modified with organic peroxide at a concentration of 0.15 to 1 weight percent. These materials exhibit improved melt strength and contain less than 10 weight percent of non-extractable gel content as measured with a 12-hour boiling reflux extraction with xylene. The absence of significant gel formation shows that the material has been modified without any crosslinking of the elastomer to improve the melt strength. The use of peroxide at this high concentration, however, has been found to cause detrimental deterioration of the molecular weight of the polypropylenic polymer.

U.S. Pat. No. 5,569,717 and Graebling et al., *Journal of Applied Polymer Science*, Vol 66, pp. 809–819, 1997, disclose that a multifunctional co-agent, or monomer, can be used to modify the rheology of polypropylene-containing materials via peroxide initiation. The preferred compositions contain 10 to 25 weight percent polyethylene with a density greater than 0.92 g/cm$^3$, more than 0.5 weight percent of trimethylolpropane triacrylate (TMPTA), and between 0.01 and 0.1 weight percent organic peroxide. These materials exhibit greatly improved melt strength for extrusion processing and thermoforming, but the resultant compositions are hard and rigid at room temperature and can therefore not be used as an alternative to plasticized polyvinyl chloride. The importance of the polyethylene for improved melt strength is demonstrated by the examples described in U.S. Pat. No. 5,569,717. The polyethylene used therein, however, was Solvay ELTEX® A1050, a high rigidity material with a density of 0.961 g/cm$^3$.

U.S. Pat. No. 6,207,746 discloses a process for producing thermoplastic elastomers with olefin-elastomer and polypropylene via a radical-initiated mechanism. The patent further teaches that radical initiators above a concentration of 0.02 parts by weight of 100 parts by weight of the elastomer are required to accomplish a sufficient degree of crosslinking and that both tri-methacrylate and tri-acrylate co-agent monomers are useful to increase the crosslinking efficiency.

Thus, there is a need for soft plastic materials for fabrication of fully recyclable articles via processes that require high melt strength.

SUMMARY OF THE INVENTION

The present invention successfully improves the rheological properties in the molten state for each component in an olefinic thermoplastic elastomer (TPE) blend. The modified olefinic TPE exhibits an increased resistance to deformation during elongation or extension and does not exhibit the disadvantages of the prior art compositions.

The invention relates to a thermoplastic elastomer composition comprising a modified blend of a propylenic resin, an ethylenic elastomer, and a multifunctional acrylic monomer comprising at least three acrylate groups, or a reaction product thereof, with the ethylenic elastomer being present in an amount by weight that is greater than that of the propylenic resin and wherein (a) the propylenic resin is at least partially branched, (b) the ethylenic elastomer is at least partially crosslinked to a gel content of at least about 25%, or (a) and (b), the modified blend having a ratio of the melt strength of the modified blend to the melt strength of an unmodified blend of a propylenic resin that is not branched and an ethylenic elastomer that is not crosslinked of about 1.5 to 15 measured at a temperature of at least about 180° C., a melt flow rate of less than about 1 dg/min measured at 230° C. under a load 2.16 kg, a melt flow rate of less than about 5 dg/min measured at 230° C. under a 10 kg load, and a hardness of less than about 95 Shore A or less than about 45 Shore D.

In preferred embodiment, the ethylenic elastomer is at least partially crosslinked. The ratio of the melt strength of the modified blend to the melt strength of the blend before modification can be about 1.6 to 12 measured at a temperature of at least about 180° C. In one embodiment, the reaction of the propylenic resin, the ethylenic elastomer, and the multifunctional acrylic monomer is initiated by heat activation at a temperature of about 200° C. to 250° C. In another embodiment, the reaction of the propylenic resin, the ethylenic elastomer, and the multifunctional acrylic monomer is initiated by the addition of less than about 0.3 pph of a free radical initiator to form the modified blend. In a embodiment, the free radical initiator has a decomposition half-life of greater than about one hour at 120° C.

In one embodiment, the modified blend includes about 5 weight percent to up to less than 50 weight percent propylenic resin and greater than 50 weight percent to about 95 weight percent of the ethylenic elastomer. In a preferred embodiment, the modified blend includes about 15 weight percent to 48 weight percent propylenic resin and about 52 weight percent to 85 weight percent of the ethylenic monomer. In another embodiment, the propylenic resin includes at least about 60 mole percent propylene monomer and the ethylenic elastomer includes at least 60 mole percent ethylene monomer.

In one embodiment, the ethylenic elastomer has a Mooney viscosity of at least about 15, a molecular weight of greater than about 80,000, and a polydispersity of greater than about 1.5. In yet another embodiment, the ethylenic elastomer has a density of less than 0.94 g/cm$^3$. In one embodiment, the multifunctional acrylic monomer is present in an amount of about 0.1 pph to 5 pph of the polymers and has no more than seven acrylate groups.

In preferred embodiment, the multifunctional acrylic monomer includes trimethylolpropane triacrylate (TMPTA), ethoxylated trimethylolpropane triacrylate, propoxylated glycerol triacrylate, pentaerythritol triacrylate, bistrimethylolpropane tetraacrylate, pentaerythritol tetraacrylate, ethoxylated pentaerythritol tetraacrylate, trimethylolpropane trimethacrylate, ethoxylated pentaerythritol triacrylate, or combinations thereof. In any of the embodiments, the propylenic resin can include a homopolymer of propylene and a copolymer of propylene and at least one monomer including $C_2$ to $C_{20}$ alpha-olefins, unsaturated organic acids and their derivatives, vinyl esters, aromatic vinyl compounds, vinylsilanes and unconjugated aliphatic and monocyclic diolefins, alicyclic diolefins which have an endocyclic bridge, conjugated aliphatic diolefins, and combinations thereof; and the ethylenic elastomer can include a copolymer of ethylene and at least one monomer comprising $C_3$ to $C_{20}$ alpha-olefins, unsaturated organic acids and their derivatives, vinyl esters, aromatic vinyl compounds, vinylsilanes and unconjugated aliphatic and monocyclic diolefins, alicyclic diolefins which have an endocyclic bridge and conjugated aliphatic diolefins, or terpolymers of at least 60 mole percent of ethylene, a $C_3$ to $C_{20}$ alpha-olefin, a non-conjugated diene monomer, or combinations thereof.

The blends of the invention can also include one or more thermal stabilizers, ultraviolet stabilizers, flame retardants, mineral fillers, extender or process oils, conductive fillers, nucleating agents, plasticizers, impact modifiers, colorants, mold release agents, lubricants, antistatic agents, pigments, and the like.

The invention also relates to compositions prepared by the process of melt blending the propylenic resin, the ethylenic elastomer, and the multifunctional acrylic monomer specified above, preferably while initiating the reaction thereof with either heat activation, a free radical initiator, or both. Further, the invention relates to articles including the composition of the invention described above, which is formed by extrusion, thermoforming, blow molding, foam processing, or calendering. In a preferred embodiment, the article is in the form of an automobile component.

The invention relates to a method for preparing a polymer blend including combining a propylenic resin, an ethylenic elastomer that is at least partially crosslinked, and a multifunctional acrylic monomer in the presence of an optional free radical initiator, to form a polymer mixture, melt blending the polymer mixture at a temperature above the melt point of the propylenic resin and below about 180° C. for about 5 to 20 seconds, and mixing the polymer mixture at a temperature of about 160° C. to 250° C. for at least about 10 to 100 seconds to at least partially crosslink the ethylenic elastomer, thereby providing a modified polymer blend having a ratio of the melt strength of the modified blend to the melt strength of an unmodified blend of a propylenic resin that is not branched and an ethylenic elastomer that is not crosslinked of about 1.5 to 15 measured at a temperature of at least about 180° C., a melt flow rate of less than about 1 dg/min measured at 230° C. under a 2.16 kg load, a melt flow rate of less than about 5 dg/min measured at 230° C. under a 10 kg load, and a hardness of less than about 95 Shore A or less than about 45 Shore D.

The invention also relates to a thermoplastic elastomer composition including a modified blend of a propylenic resin, a styrenic elastomer, and a multifunctional acrylic monomer comprising at least three acrylate groups, or a reaction product thereof, wherein (a) the propylenic resin is at least partially branched, (b) the styrenic elastomer is at least partially crosslinked to a gel content of at least about 25%, or (a) and (b), the modified blend having a ratio of the melt strength of the modified blend to the melt strength of an unmodified blend of a propylenic resin that is not branched and a styrenic elastomer that is not crosslinked of about 1.5 to 15 measured at a temperature of at least about 180° C., a melt flow rate of less than about 1 dg/min measured at 230° C. under a 2.16 kg load, a melt flow rate of less than about 5 dg/min measured at 230° C. under a 10 kg load, and a hardness of less than about 95 Shore A or less than about 45 Shore D.

The invention further relates to a method for preparing a composition by combining a propylenic resin that is at least partially branched, an ethylenic elastomer, and a multifunctional acrylic monomer, to form a polymer mixture, melt blending the polymer mixture at a temperature above the melt point of the propylenic resin and below about 180° C. for about 5 to 20 seconds, and mixing the polymer mixture at a temperature of about 160° C. to 250° C. for at least about 10 to 100 seconds to provide a modified polymer blend having a ratio of the melt strength of the modified blend to the melt strength of an unmodified blend of a propylenic resin that is not branched and an ethylenic elastomer that is not crosslinked of about 1.5 to 15 measured at a temperature of at least about 180° C., a melt flow rate of the modified blend of less than about 1 dg/min measured at 230° C. under a 2.16 kg load, a melt flow rate of the modified blend of less than about 5 dg/min measured at 230° C. under a 10 kg load, and a hardness of less than about 95 Shore A or less than about 45 Shore D.

The invention also relates to embodiments above where a styrenic elastomer is at least partially or even entirely subsituted for the ethylenic elastomer. In one preferred embodiment, styrene forms at least about 50 mole percent of the styrenic elastomer portion of the blend. Any suitable styrenic elastomer or combination thereof can be included in forming the modified blend, including styrene in copolymers with various monomers. For example, styrene-butadiene, styrene-ethylene-butylene-styrene, or the like can be included.

DETAILED DESCRIPTION OF THE INVENTION

Figure 1:
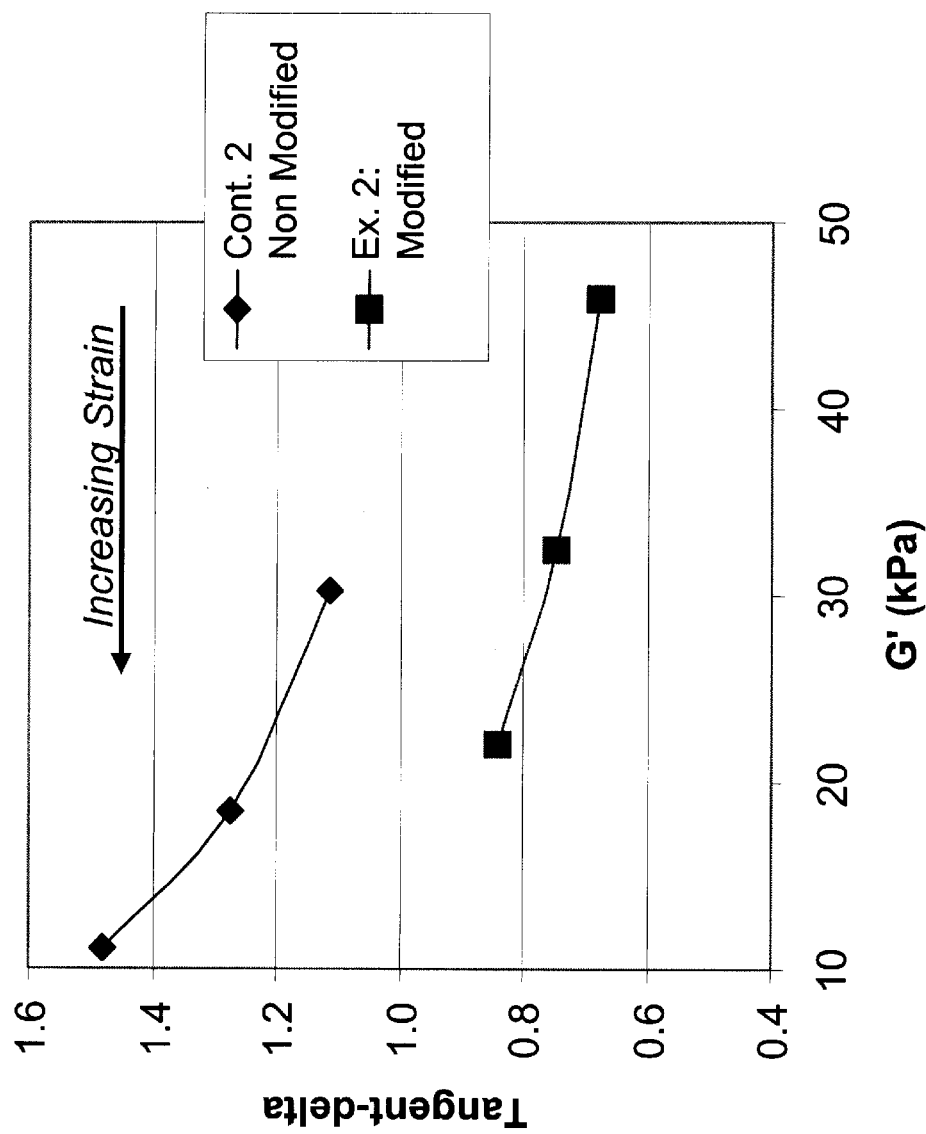
FIG. 1 shows a graphical depiction of the mechanical loss factor (tangent-delta) as a function of the in-phase shear modulus (G'), or storage modulus, for Example 2 and Control 2, measured at constant shear rate (approximately 14 sec$^{-1}$) obtained by variable strain and frequency at a temperature of 160° C. in the melt state.

It has been found that thermoplastic elastomer compositions that include one or more propylenic resins (A) and one or more ethylenic elastomers (B) can be modified by the addition of one or more multifunctional acrylate monomers (C), whereby the resin is partially branched, the at least one of the elastomers is partially crosslinked during melt blending, or both. At least one of the propylenic resins (A) has minimized or avoided degradation compared to what normally would occur during conventional peroxide modification. Instead, each of the at least one resins is branched by the ethylenic elastomer and/or by itself. Since degradation of the resin (A) must be minimized or avoided, the melt flow rate of the modified olefinic TPE measured at 230° C., under a 2.16 kg load, should be kept to less than about 1 dg/min and the melt flow rate of the modified olefinic TPE measured at 230° C., under a 10 kg load, should be kept to less than about 6.5 dg/min. The invention further permits production of such materials at a lower cost than the prior art such that they are more commercially feasible.

In particular, the modified olefinic TPE blends yield high melt strength according to the invention. The ratio of the melt strength of the modified blend to the melt strength of the blend before such modification, as determined by tests with the Gottfert™ Rheotens Melt Tension instrument Model 71.97 at a temperature of at least 180° C., should be about 1.5 to 15, preferably about 1.6 to 12. In the at least partially crosslinked embodiment, the current invention provides sufficient crosslinking of the elastomer while being substantially free or completely free of free radical initiator when certain tri-acrylate monomers are used in the presence of olefin elastomers and polypropylene.

As used herein, the term "substantially free" refers to the presence of less than about 5 weight percent, preferably less than about 1 weight percent, of the material referred to. In one preferred embodiment, "substantially free" refers to the presence of less than about 0.1 weight percent of the material.

The modification of the invention can be applied to practically any thermoplastic olefin blend that includes at least one high melting range polymer including polypropylene (PP) polymer blends, propylene/ethylene (P/E) copolymer blends, or selected reactor PP alloy blends. The modification is particularly useful for blends initially having poor melt strength, such as those compositions prepared from semi-crystalline elastomer components with narrow molecular weight distributions.

Melt strength is the property that keeps a polymeric material from exhibiting tearing or excessive deformation when subjected to stress while in the melted state. For example, vacuum thermoforming processes require that a material be pre-heated without sagging under the force of gravity and then be stretched over a thermoforming mold without tearing. Melt strength is also desirable for blow molding processes whereby molten or softened material is deformed from within by air pressure into a constraining mold. Foaming processes also benefit from melt strength, which leads to improvement of large bubble formation without tearing of the polymer. Increasing the molecular weight of any given polymer can increase the melt strength with all other factors held equal. A higher molecular weight by itself will increase polymer viscosity as well. A balance is always required between the desired consequences of high molecular weight polymers, such as melt strength, and the adverse consequences, such as melt viscosity, which is an undesirable property for the melt processing of a polymer. High molecular weight amorphous polymers, such as polyvinyl chloride and polystyrene, exhibit high melt strength and drawability during processing via melt extrusion or thermoforming. Unlike olefinic polymers, however, these two polymers are not easily recycled.

Additional properties desired for certain applications, such as automotive interior skin layers, include low temperature flexibility, high temperature service, abrasion resistance, toughness, and low surface gloss.

The propylenic resin (A) preferably includes about 5 weight percent to 50 weight percent of the composition of the present invention and is chosen from the homopolymers of propylene and the copolymers of the propylene containing at least about 60 mole percent of the propylene and at least one other monomer chosen from $C_2$ to $C_{20}$ alpha-olefins, unsaturated organic acids and their derivatives, vinyl esters, aromatic vinyl compounds, vinylsilanes and unconjugated aliphatic and monocyclic diolefins, alicyclic diolefins which have an endocyclic bridge, conjugated aliphatic diolefins, and combinations thereof. Ethylene, 1-butene, 1-pentene, 1-hexene, methyl-1-butenes, methyl-1-pentenes, 1-octene and 1-decene are examples of preferred alpha-olefins. In one preferred embodiment, the compositions of the invention include about 6% to 49%, and more preferably about 15% to 48% by weight of propylenic resin(s).

Examples of other monomers for preparation of the propylenic resin include acrylic acid, methacrylic acid, maleic acid, methyl methacrylate, glycidyl acrylate and methacrylate, maleic anhydride, vinyltrimethylmethoxysilane and gamma-methacryloyloxypropyltrimethoxysilane, vinyl acetate and butyrate, as well as 1,4-hexadiene, 4-vinylcyclohexene, dicyclopentadiene, methylene- and ethylidenenorbornene, butadiene, isoprene copolymers, or blends thereof.

Copolymers of propylene with alpha-olefins are particularly preferred and, among these, copolymers of propylene with at least one other monomer chosen from ethylene and 1-butene yield particularly good results.

As used herein, "propylenic resin" and "propylene copolymers" are each intended to mean one or more of the random copolymers of propylene, the block copolymer(s) of propylene, or combinations thereof. As used herein, "ethylenic elastomers" refer to one or more random copolymers of ethylene, the block copolymers of ethylene, or combinations thereof.

The random copolymers generally include macromolecular chains in which the monomers are distributed statistically. The propylene content of these random copolymers is generally greater than about 70 mole percent and preferably at least about 75 mole percent. The block copolymers include distinct blocks of variable composition; each block including a homopolymer of propylene or of another alpha-olefin or of a random copolymer, including propylene, and the at least one other monomer chosen from the above-mentioned monomers.

Although any suitable method is included within the scope of the invention, copolymers with propylene blocks are generally obtained by polymerization in a number of consecutive stages in which the different blocks are prepared successively. Propylene copolymers are generally preferred and are commercially available as, for example, PROFAX® from Basell North America, Inc. of Wilmington, Del., as FORTILENE® from Solvay Polymers of Houston, Tex. and as ACCTUFF® or ACCPRO® from British Petroleum Chemicals of Houston, Tex.

The resin (A) typically has a melt flow rate as measured by the method ASTM D-1238 at a temperature of 230° C. and at a load of 2.16 kg of about 0.01 dg/min to 100 dg/min, preferably about 0.01 dg/min to 20 dg/min. In one more preferred embodiment, the melt flow rate is about 0.01 dg/min to 10 dg/min.

The ethylenic elastomer (B) includes greater than about 50 weight percent to about 95 weight percent, preferably about 51 weight percent to 95 weight percent, and more preferably about 52 weight percent to 85 weight percent of the composition of the current invention with a Mooney viscosity (ML 1+4, 125° C.), as measured by ASTM D-1646, of at least about 15; with a molecular weight greater than about 80,000; with a polydispersity of greater than about 1.5; and with a density of about 0.85 g/cm$^3$ to 0.95 g/cm$^3$. In another embodiment, the ethylenic elastomer is present in an amount of about 55 weight percent to 85 weight percent. Preferably, the density is about 0.85 g/cm$^3$ to less than 0.94 g/cm$^3$, more preferably about 0.85 g/cm$^3$ to 0.93 g/cm$^3$, and most preferably about 0.85 g/cm$^3$ to 0.92 g/cm$^3$. The elastomer (B) can be chosen from copolymers of at least about 60 mole percent of ethylene and at least one other monomer chosen from $C_3$ to $C_{20}$ alpha-olefins, unsaturated organic acids and their derivatives, vinyl esters, aromatic vinyl compounds, vinylsilanes and unconjugated aliphatic and monocyclic diolefins, alicyclic diolefins that have an endocyclic bridge and conjugated aliphatic diolefins, or terpolymers of at least 60 mole percent of ethylene, a $C_3$ to $C_{20}$ alpha-olefin, a nonconjugated diene monomer, and combinations thereof. In one embodiment, the elastomer (B) comprises less than about 90 mole percent ethylene.

The modified blends of the invention also are typically softer than comparable prior art plasticized polyvinyl chlorides and related materials, as the present invention provides materials having a typical hardness of less than about 95 Shore A or less than about 45 Shore D as measured by ASTM D-2240.

In the case of ethylene/alpha-olefin copolymers, the alpha-olefin includes one or more $C_3$ to $C_{20}$ alpha-olefins, with propylene, butene, hexene, and octene preferred, and propylene most preferred.

For elastomeric terpolymers, the alpha-olefin again includes one or more of $C_3$ to $C_{20}$ alpha-olefins with propylene, butene, and octene preferred and propylene most preferred. The diene component includes one or more of $C_4$ to $C_{20}$ dienes, preferably non-conjugated dienes. Examples of suitable dienes include straight chain, hydrocarbon di-olefin or cylcloalkenyl-substituted alkenes having from 6 to 15 carbon atoms. Specific preferred examples include one or more classes or species including (a) straight chain acyclic dienes such as 1,4-hexadiene and 1,6-octadiene; (b) branched chain acyclic dienes such as 5-methyl-1,4-hexadiene; 3,7-dimethyl-1,6-octadiene; 3,7-dimethyl-1,7-octadiene; and the mixed isomers of dihydro-myricene and dihydro-ocinene; (c) single ring alicyclic dienes, such as 1,3 cyclopentadiene; 1,4-cyclohexadiene; 1,5-cyclooctadiene and 1,5-cyclododecadiene; (d) multi-ring alicyclic fused and bridged ring dienes such as tetrahydroindene; methyl-tetrahydroindene; dicyclopentadiene (DCPD); bicyclo-(2.2.1)-hepta-2,5-diene; alkenyl, alkylidene, cycloalkenyl and cycloalkylidene norbornene, such as 5-methylene-2-norbornene (MNB), 5-propenyl-2-norbornene, 5-isopropylidene-2-norbornene, 5-ethylidene-2-norbornene (ENB), 5-(4-cyclopentenyl)-2-norbornene, 5-cyclohexylidene-2-norbornene, and 5-vinyl-2-norbornene (VNB); (e) cycloalkenyl-substituted alkenes, such as allyl cyclohexene, vinyl cyclooctene, allyl cyclodecene, vinyl cyclododecene. Of the non-conjugated dienes typically used, the preferred dienes are dicyclopentadiene, 1,4-hexadiene, 5-methylene-2-norbornene, and 5-ethylidene-2-norbornene, or combinations thereof. More preferred diolefins are 5-ethylidene-2-norbornene; 1,4-hexadiene, dicyclopentadiene, 5-vinyl-2-norbornene, and combinations thereof. As used herein, the terms "non-conjugated diene" and "diene" are used interchangeably.

In another embodiment, a styrenic elastomer with up to about 50 mole percent styrene may be used in place of, or in addition to, the ethylenic elastomer (B). "Styrenic elastomer" as used herein, designates an elastomer having at least one block segment of a styrenic monomer in combination with an olefinic component. Linear- or radial-type and diblock- or triblock-type styrenic elastomers can be used herein. The styrenic portion of the elastomer is preferably a polymer of styrene and its analogs and homologs, including alpha-methylstyrene, and ring-substituted styrenes, particularly ring-methylated styrenes. The preferred styrenics are styrene and alpha-methylstyrene, with styrene being especially preferred. The olefinic component of the styrenic elastomer may be ethylene, butylene, butadiene, isoprene, propylene, or combinations thereof. Preferred styrenic elastomers include styrene-ethylene/butylene, styrene-ethylene/butylene-styrene, styrene-ethylene/propylene, styrene-ethylene/propylene-styrene, styrene-ethylene/propylene-styrene-ethylene-propylene, styrene-butadiene-styrene, styrene-butylene-butadiene-styrene, or combinations thereof.

The elastomers (B) may be linear, substantially linear, random, blocky or branched. The elastomer (B) can be used alone or as a mixture of two or more kinds thereof.

In one embodiment, the ethylenic elastomer (B) is at least partially cured in the composition of the current invention, with at least about 25% crosslinking or gel content. Although the cured elastomer is thermoset, the final product is still thermoplastic. When gel are present due to crosslinking, the particles present typically have a size no greater than about 0.2 mm average diameter. Most polyolefin elastomers are satisfactory in the practice of the invention since the percentage of crosslinking is independent of the type of the elastomer. Exemplary elastomers are commercially available as NORDEL® or ENGAGE® from DuPont Dow Elastomers LLC of Wilmington, Del., as KELTAN® from DSM Elastomers Americas of Baton Rouge, La., as VISTALON® or EXACT® from ExxonMobil Chemicals of Houston, Tex., as DUTRAL® from EniChem Elastomers Americas of Houston, Tex., as BUNA® EP from Bayer Corporation of Pittsburgh, Pa., as ROYALENE® from Uniroyal Chemicals of Middlebury, Conn. or as KRATON® from Kraton Polymers of Houston, Tex.

The multifunctional monomers, which can efficiently accomplish the modification of the final blend either with or without the presence of free radical initiators, must include acrylate functional monomers, which are preferred over methacrylate monomers. The functional compounds (C) that can be employed in the compositions of present invention generally contain at most 7 acrylate groups and typically include up to about 5 pph, preferably up to about 4 pph, and more preferably about 0.1 pph to 3 pph of the composition. Compounds (C) that contain 3 to 5 acrylate groups yield good results. Preferred examples of these compounds include trimethylolpropane triacrylate (TMPTA), ethoxylated trimethylolpropane triacrylate, propoxylated glycerol triacrylate, pentaerythritol triacrylate, bistrimethylolpropane tetraacrylate, pentaerythritol tetraacrylate, ethoxylated pentaerythritol tetraacrylate, and ethoxylated pentaerythritol triacrylate. One or more of these compounds (C) may be used.

Trimethylolpropane triacrylate, ethoxylated trimethylolpropane triacrylate, pentaerythritol triacrylate, bistrimethylolpropane tetraacrylate and ethoxylated pentaerythritol tetraacrylate yield particularly good results when included as the multifunctional monomer. Monomers including trimethylolpropane triacrylate are most preferred. The content of trimethylolpropane triacrylate can be up to about 5 pph, preferably up to about 4 pph, and more preferably about 0.1 to 3 pph.

To promote the free radical reaction between the multifunctional monomer (C) and the polymeric components (A)+(B), some type of initiator is preferably provided when a multifunctional monomer is used. This can be accomplished with heat and shear alone to initiate auto-polymerization of the monomer (C). The activity of the multifunctional monomer (C) may be accelerated by heat activation at temperatures as low as about 200° C. to 250° C. Other suitable methods and materials to initiate and/or promote the free radical reaction are also contemplated.

Alternatively, free radical initiators may be introduced into the melt mixer. Free radical initiators useful for this invention, such as organic peroxides, should have a decomposition half-life of greater than about one hour at 120° C. Examples of free radical initiators that are useful are dicumyl peroxide; bis(alpha-t-butyl peroxyisopropyl) benzene; isopropylcumyl t-butyl peroxide; t-butylcumylperoxide; di-t-butyl peroxide; 2,5-bis(t-butylperoxy)2, 5-dimethylhexane; 2,5-bis(t-butylperoxy)2, 5-dimethylhexyne-3; 1,1-bis(t-butylperoxy)3,3,5-trimethylcyclohexane; isopropylcumyl cumylperoxide; di(isopropylcumyl) peroxide, 3,6,9-triethyl-3,6,9-trimethyl-1,4,7-triperoxonane; or mixtures thereof. The peroxides 2,5-bis(t-butylperoxy)2, 5-dimethylhexane, 3,6,9-triethyl-3,6,9-trimethyl-1,4,7-triperoxonane, and 2,5-bis(t-butylperoxy)2, 5-dimethylhexyne-3 are preferred in the free radical initiator due to their liquid state, low volatility, higher decomposition temperature, and lower residual odor in the final article compared to other peroxides.

The optimization of the free radical initiators in the melt state is very critical in the state of art. The amount of peroxide or other free radical initiators should be sufficient to generate TMPTA radicals without generating polymer radicals. The proper amount of peroxides should vary with different peroxides and polymers, as is readily understood and determined by one of ordinary skill in the art. Generally, less than about 0.1 pph of peroxides should be used, preferably less than about 0.05 pph.

Other polymeric components, such as polyethylene, may be present in the blend of this invention to improve mechanical properties of the final composition. For example, either high density polyethylene or low density polyethylene can be used. This polyethylene component, containing crystalline and/or semi-crystalline homopolymers of ethylene, is preferably present in the blend in an amount of up to about 10 weight percent, preferably about 1 weight percent to 5 weight percent, and more preferably about 2 weight percent to 4 weight percent of total polymer weight.

Other additives that may be added to this composition include thermal stabilizers, ultraviolet stabilizers, flame retardants, mineral fillers, extender or process oils, conductive fillers, nucleating agents, plasticizers, impact modifiers, colorants, mold release agents, lubricants, antistatic agents, pigments, and the like, to vary the resultant properties.

Suitable mineral fillers include, but are not limited to, talc, ground calcium carbonate, precipitated calcium carbonate, precipitated silica, precipitated silicates, precipitated calcium silicates, pyrogenic silica, hydrated aluminum silicate, calcined aluminosilicate, clays, mica, wollastonite, and combinations thereof.

Extender oils are often used to reduce any one or more of viscosity, hardness, modulus, and cost of a composition. The most common extender oils have particular ASTM designations depending upon whether they are classified as paraffinic, naphthenic or aromatic oils. One of ordinary skill in the art of processing of elastomers will readily recognize the type and amount of oil that would be most beneficial for any given application. The extender oils, when used, are desirably present in an amount of about 10 pph to 80 pph, based on total composition weight.

Foaming agents can be included in the mixture such as to produce foamed articles. The expanding medium, or foaming agent, can include a physical foaming agent or a chemical foaming agent, or both. A physical foaming agent is a medium-expanding composition that is a gas at temperatures and pressures encountered during the foam expanding step. Typically, a physical foaming agent is introduced to the polymer blend in the gaseous or liquid state and expands, for example, upon a rapid decrease in pressure. A chemical foaming agent is a compound or mixture of compounds that decompose at elevated temperatures to form one or more gases, which can be used to expand at least a portion of the polymer blend into a foam.

Melt blending is one method for preparing the final polymer blend of the present invention. Techniques for melt blending of a polymer with additives of all types are known to those of ordinary skill in the art and can typically be used with the present invention. Typically, in a melt blending operation useful with the present invention, the individual components of the blend are combined in a mechanical extruder or mixer, and then heated to a temperature sufficient to form a polymer melt and effect the reactive modification. The mechanical mixer can be a continuous or batch mixer. Examples of suitable continuous mixers include single screw extruders, intermeshing co-rotating twin screw extruders such as Werner & Pfleiderer ZSK™ extruders, counter-rotating twin screw extruders such as those manufactured by Leistritz™, and reciprocating single screw kneaders such as Buss™ co-kneaders. Examples of suitable batch mixers include lateral 2-roll mixers such as Banbury™ or Boling™ mixers. The resin (A), the elastomer (B), and the multifunctional monomer (C) are then melt blended, optionally by shear mixing until the propylenic resin is partially branched, the ethylenic elastomer is partially crosslinked, or both, and the elastomer is homogeneously dispersed in the resin matrix. Sufficient residence time at a minimum temperature must also be allowed to fully react with the multifunctional acrylic monomer (C), and thermally decompose the optional free radical initiator (D). The temperature of the melt, residence time of the melt within the mixer, and the mechanical design of the mixer are several variables that control the amount of shear to be applied to the composition during mixing and can be readily selected by one of ordinary skill in the art based on the disclosure of the invention herein.

In a preferred embodiment, the final polymer blend is prepared by mixing the components in a modular intermeshing co-rotating twin-screw extruder, such as those manufactured by Werner and Pfleiderer under the trade name of ZSK™. Other manufacturers of this type of equipment include co-rotating twin screw extruders from Berstorff™, Leistritz™, Japanese Steel Works, and others. The screw diameter for this type of mixer may vary from about 25 mm to 300 mm. Commercially viable production rates of the thermoplastic elastomer composition are typically achievable with screw diameters of at least about 70 mm.

The mixing extruder includes a series of sections, or modules, that perform certain mixing functions on the composition. The two polymeric components (A) and (B) are fed into the initial feed section of the extruder as solid granules at the main feed hopper. The reactive monomer (C) may also be fed into the main feed hopper, or injected as a liquid into the side of the extruder barrel about 1 to 3 times the distance of the screw diameter downstream of the main feed hopper. The optional free radical initiator may also be fed as a dry solid, such as liquid peroxide absorbed onto particulate calcium carbonate, or injected as a pure liquid, or in a blend with mineral oil, about 1 to 3 times the distance of the screw diameter downstream from the main feed hopper.

Other ingredients, such as fillers, thermal stabilizers, and the like, as described above, may also be fed into the main feed hopper of the mixing extruder as dry powders or liquids. It is preferred that the majority of thermal stabilizers and UV stabilizers be added in a downstream section of the mixer, such as is described in U.S. Pat. No. 5,650,468.

When crosslinking is desired, polymers (A) and (B), and monomer (C) are homogenized with an initial melting and mixing section of the extruder. The polymer melt temperature is raised by a sequence of kneading blocks to just above the highest softening point of the polymer blend. Within this first mixing section of the extruder, it is desirous to maintain the polymer temperature above the melt point of the propylenic resin (A), but below the auto-polymerization temperature of the multifunctional monomer (C) or the decomposition temperature of the optional free radical initiator (D) when these are present, within the time frame of the melting process of about 5 to 20 seconds. A melt temperature of about 160° C. to 180° C. is preferred for the first mixing section.

An extending oil may be injected after the first melting section and prior to the primary reaction section. Addition of oil at this point helps to cool the melt temperature and prevent auto-acceleration of the monomer reaction. The melt temperature of the mixture must be maintained at a high enough point during incorporation of the extending oil to inhibit or prevent solidification of the polymeric components.

Following the first mixing section, and optional oil-extension section, there is optionally a second mixing section of the extruder that performs kneading and distributive mixing that ensures uniform distribution of the multifunctional monomer into the blend of polymers. During this second mixing section, crosslinking of the ethylenic elastomer (B) occurs via a free radical process and conditions can be set so that branching of the propylenic resin (A) also occurs. The melt temperature in this section should be about 160° C. to 250° C., preferably about 170° C. to 220° C. The residence time within the second mixing section should be at least about 10 seconds, but no more than about 100 seconds, to inhibit or prevent excessive thermal degradation. The preferred residence time in the second mixing section is about 10 seconds to 30 seconds.

A de-gassing section, or de-volatilization zone, is required to remove any gaseous by-products of the branching and crosslinking reactions. If the optional free radical initiator is used, there will be low molecular weight by-products that need to be removed from the composition. A melt seal is used at the end of the second mixing section and is accomplished by use of a reverse feed element, or reverse kneading element. Downstream of the melt seal there are standard feed elements to convey material past a vacuum port, which is used to remove volatile components.

A second solids addition point may be incorporated into the extrusion mixer either upstream or downstream of the de-gassing section. This second solids addition point may be used to incorporate stabilization additives, colorants, fillers, and the like. The final section of the mixing extruder includes melt compression prior to extrusion through a die plate. The melt compression can be accomplished with the co-rotating twin screw extruder, or melt compression can be performed by a de-coupled process, such as a single screw extruder or a melt gear pump. At the end of the compression section, the composition is discharged through a die plate.

The improved melt strength thermoplastic elastomer composition of the present invention may be pelletized, such as by strand pelleting or commercial underwater pelletization.

Pellets of the composition are then used to manufacture articles through conventional processing operations, such as thermoforming, that involve stretching and/or drawing. Similar industrial processes involving stretching and/or drawing include extrusion, blow molding, calendering, or foam processing. In each of these processes, the melt strength of the polymer is critical to its success, since the melted and/or softened polymer must retain its intended shape while being handled and/or cooled.

During extrusion, for example, a plastic sheet extrusion system is fed by one or more extruders feeding a sheet extrusion die. The die is closely followed by a roll cooling system. The resulting partially cooled sheet is further cooled on a roller conveyor of finite length. No particular limitation is imposed on the method of extrusion, and various known methods can be employed. The process of extrusion is well known to those of ordinary skill in the art and is described in detail in, e.g., Rauwendaal, "Polymer Extrusion" (ISBN 0-19-520747-5) Hanser Publications, New York (1990).

During calendering, a sheet is formed by passing the material through a series of heated rollers, with the gap between the last pair of heated rollers determining the thickness of the sheet. The process of calendering is well known to those of ordinary skill in the art and is described in detail in, e.g., Bering, "SPI Plastics Engineering Handbook" (ISBN 0-442-31799-9) Van Nostrand Reinhold, New York (1991).

Thermoforming is the process of heating a plastic material in sheet form to its particular processing temperature and forming the hot and flexible material against the contours of a mold by mechanical or pneumatic means. When held to the shape of the mold and allowed to cool, the plastic retains the shape and detail of the mold. The process of thermoforming is well known to those of ordinary skill in the art and is described in detail in, e.g., Throne, "Thermoforming" (ISBN 0-02-947610-0) Hanser Publications, New York (1987).

During foam processing, a structure that must hold its shape is developed from melted polymer by the use of blowing agents. U.S. Pat. No. 4,323,528, which is expressly incorporated herein by reference thereto, relates to making polyolefin foams using an accumulating extrusion process. The process includes: 1) mixing a thermoplastic material and a blowing agent to form a polymer gel; 2) extruding the gel into a holding zone maintained at a temperature and pressure that does not allow the mixture to foam; the holding zone has a die defining an orifice opening into a zone of lower pressure at which the gel foams and an openable gate closing the die orifice; 3) periodically opening the gate; 4) substantially concurrently applying the mechanical pressure by means of a movable ram on the gel to eject it from the holding zone through the die orifice into the zone of lower pressure; and 5) allowing the ejected gel to expand to form the foam. The process of foam processing is well known to those of ordinary skill in the art and is described in detail in, e.g., Frisch, "Plastic Foams" (ISBN 0-82-471218-8) Marcel Dekker, New York (1972).

During blow molding, air pressure is used to expand the melted polymer into hollow shapes. The principal advantage of this process is its ability to produce hollow shapes without having to join two or more separately molded parts. The process of blow molding is well known to those of ordinary skill in the art and is described in detail in, e.g., Rosato, "Blow Molding Handbook" (ISBN 0-19-520761-0) Hanser Publications, New York (1989).

Articles that can be manufactured from the current invention include interior automotive components, such as instrument panel skins and door panel skins; building materials, such as thermal and sound insulation; packaging materials; electrical and electronics materials; and nonwoven fabrics and fibers.

The melt strength of a polymer is determined here by a Gottfert™ Rheotens Melt Tension instrument Model 71.97, which measures the force in centi-Newtons (cN) required to pull a polymer melt strand from a capillary die at constant acceleration. In this test, a polymer melt strand extruded vertically downwards from a capillary die was drawn by rotating rollers whose velocity increased at a constant acceleration rate. The polymer melt being stretched typically undergoes uniaxial extension. The melt strength parameter does not give a well-defined rheological property because neither the strain, nor the temperature, was uniform in the polymer melt being stretched. The test is useful, however, in obtaining meaningful comparisons of the drawing behavior of different polymers. The measured force increases as the roller velocity is increased and then generally remains constant until the strand breaks. Melt strength tests were conducted by piston extrusion of polymer melt through a die 2 mm in diameter at a wall shear rate of 58 $\sec^{-1}$, and at a melt temperature of at least 180° C., and at a constant acceleration of 1.2 mm/s².

In order to measure the gel content of the partially cured ethylenic elastomer, a Soxhlet extraction technique is used to determine the amount of extractables. The equipment includes a 500 ml pear-shaped flask, the Soxhlet apparatus and a Dimroth cooler. A sample of approximately one gram is compressed to a very thin film and then cut into pieces of approximately 0.5 cm² to 1 cm², brought into an extraction thimble, and mounted in the Soxhlet apparatus. The extraction is performed with 300 mL xylene. The xylene in the flask is heated with a heat mantle connected to a voltage controller set at a temperature of 140° C. After refluxing for about 12 hours, the xylene is removed in a vacuum oven by dry air at 120° C. for at least 12 hours. Subsequently, the weight of the residue in the flask is determined. The amount of crosslinking is expressed as a percentage of gel content calculated from the amount of xylene insoluble polymeric material minus any nonsoluble fiber divided by the total amount of crosslinked elastomeric material.

Figure 2:
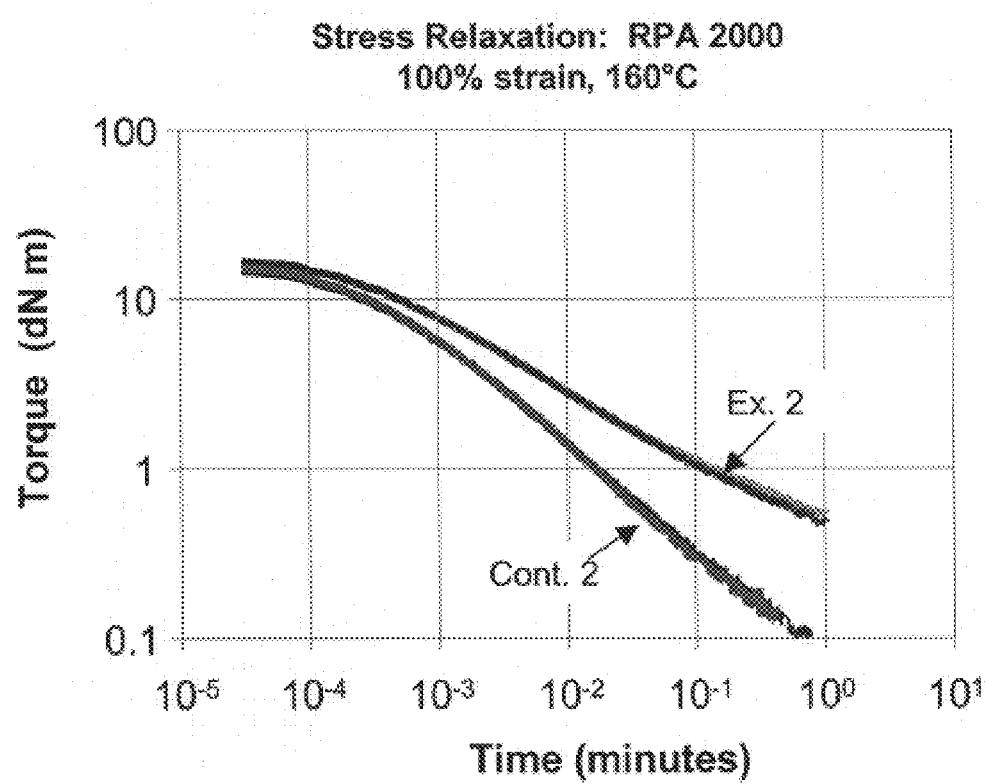
FIG. 2 is a graphical depiction of the stress relaxation exhibited by the invention, as measured with the RPA-2000 device.

The improvement of polymer rheological behavior is shown by shear viscosity tests with an RPA 2000 instrument manufactured by Alpha Technologies. The RPA 2000 utilizes a biconic cavity forced angular displacement applied to the lower cavity and a transducer that measures torque and displacement of the upper cavity. The instrument is very similar to those described in ASTM D-5289 or ASTM D-6204, except that rotational strain and frequency are programmable variables during the test. The test cavity is very similar to a parallel plate rheometer, with a sealed test cavity and biconical dies to prevent edge slip. The cavity size is approximately 35 mm in diameter with a volume of 4.5 cm³. Samples were heated to 190° C. to fully melt the material with an applied strain of 42% and 1 Hz frequency, and then were cooled to 160° C. for variable frequency and strain tests near the solidification point. This test condition was chosen to simulate the process of thermoforming just above the melt point of the propylenic resin. Stress relaxation was also measured with this instrument at a temperature of 160° C. after an initial deformation of 7° (100% strain) applied over a duration of approximately 5 milliseconds. The resulting decay in torque was recorded for sixty seconds. Test results from these tests are shown in FIGS. 1 and 2.

Articles formed from the improved melt strength thermoplastic elastomer composition of the present invention are desired to be fully recyclable either as in-process waste or post-consumer waste. Polyolefins can be easily recycled with little or no change in mechanical properties during the re-processing step. This is not the case for polyvinyl chloride, which easily degrades during recycling. The recyclability of the composition was tested by multiple extrusion passes through a twin screw extruder, up to seven times. Properties of the composition were tested after each extrusion pass to demonstrate that the improved melt strength composition can be recycled.

Unless indicated to the contrary, all weight percents are relative to the weight of the total composition.

Unless indicated to the contrary, the expression pph means parts per hundred of polymer, by weight, in the final composition.

Unless specified otherwise, the term "Mooney viscosity," as used herein, means viscosity measured according to ASTM D-1646, incorporated herein by reference, using a shear rheometer at 125° C. and measured according to ML 1+4.

The term "about," as used herein, should generally be understood to refer to both numbers in a range of numerals. Moreover, all numerical ranges herein should be understood to include each tenth of an integer within the range.

All of the patents and other publications recited herein are incorporated herein by express reference thereto.

The invention is further illustrated by the following examples.

EXAMPLES

Blends of the current invention were mixed and then injection molded into plaques approximately 3.2 mm thick from which ASTM D-412 Type C dumbbell specimens were die cut and then measured for mechanical properties at test speeds of 500 mm/min with a gage length of 25 mm.

The following measurement methods were used in the examples:

100% Modulus, MPa Modulus at 100% elongation, with crosshead velocity of 500 mm/min, measured in mega Pascals, according to ASTM D-412

UTS, MPa Ultimate tensile strength, with crosshead velocity of 500 mm/min, measured in mega Pascals, according to ASTM D-412

Ult. Elong. % Ultimate elongation percent, with crosshead velocity of 500 mm/min, according to ASTM D-412

Gel content Crosslinked weight percent determined by Soxhlet extraction with boiling xylene, expressed as the percent of un-extractable material relative to the polyolefin elastomer added to the composition Melt Tension [cN] Melt strength as determined by a Gottfert™ Rheotens Melt Tension instrument Model 71.97 that measures the force in centi-Newtons (cN) required to pull a polymer melt strand from a capillary die at constant acceleration at a temperature of at least 180° C.

$MFR_{2.16}$ Melt flow rate measured at 230° C., under a load of 2.16 kg, according to ASTM D-1238

$MFR_{10}$ Melt flow rate measured at 230° C., under a load of 10 kg, according to ASTM D-1238

Hardness Shore A and/or Shore D hardness measured according to ASTM D-2240 at 5 seconds and at room temperature Apparent Viscosity Viscosity was measured at 190° C. with a capillary die 20×1 mm, according to ASTM D-3835, at an apparent shear rate of 100 sec$^{-1}$ Melt Strength Ratio Ratio of the melt strength of the modified blend to the melt strength of the blend before modification measured at a temperature of at least about 180° C.

Materials Used in the Examples

PP-1 Polypropylene copolymer with less than 0.5 mole percent of ethylene and a melt flow rate of 0.45 dg/min PP-2 Polypropylene homopolymer with a melt flow rate of 0.7 dg/min Elastomer-1 Terpolymer of ethylene, alpha-olefin and diene monomer; Ethylene content 70%; ethylidene norbornene content 5%; Mooney 70 (ML 1+4, 125° C.); molecular weight (MW): 200,000; Polydispersity: 3

Elastomer-2 Terpolymer of ethylene, alpha-olefin and diene monomer; Ethylene content 70%; ethylidene norbornene content 5%; Mooney 25 (ML 1+4, 125° C.); molecular weight (MW): 125,000; Polydispersity: 4

Elastomer-3 Copolymer of ethylene and alpha-olefins; Ethylene content 70%; Mooney 35 (ML 1+4, 125° C.); molecular weight (MW): 150,000; Polydispersity: 2.0; Density: 0.863 g/cm$^3$ Elastomer-4 Copolymer of ethylene and alpha-olefins; Ethylene content 70%; Mooney 35 (ML 1+4, 125° C.); molecular weight (MW): 140,000; Polydispersity: 2.0; Density: 0.868 g/cm$^3$ Extender oil High viscosity paraffinic oil, such as Witco HYDROBRITE WHITE oil commercially available from Crompton of Middlebury, Conn.

TMPTA Trimethylolpropane triacrylate

TAC Triallyl cyanurate

TMPTMA Trimethylolpropane trimethacrylate

Peroxide-1 2,5-bis(t-butylperoxy)2,5-dimethylhexyne-3

Peroxide-2 2,5-bis(t-butylperoxy)2,5-dimethylhexane

The examples shown below in Table I were prepared in a Leistritz 34 mm co-rotating twin screw laboratory extruder Model LSM30.34 with a length to diameter ratio (L/D) of 40. The solid materials were added in the first feed port while the extender oil, when used, was added during the curing reaction. The extrusion temperature was 205° C., and the extruder speed was 200 rpm. All examples were prepared with about 0.2 pph of appropriate process and heat stabilizers, such as Tetrakis[methylene(3,5-di-tert-butyl-4 hydroxy hydrocinnamate)]methane.

The information presented in Table 1 shows the contrast between the use of different polypropylenes having different melt flow rates, as well as the use of different elastomers. The modified compositions were easy to process since the low concentration of peroxide minimized polypropylene degradation. The melt strength of the polypropylene therefore contributed to the overall melt strength of the blend, along with the elastomer phase. This is illustrated by the fact that although the gel content (measuring the amount of elastomer crosslinking) of Example 2 is 7% higher than that of Example 1, the melt strength of Example 1 is almost 17% higher than Example 2. The only difference between the two samples is the type of polypropylene used. No significant difference in properties or gel content is seen for the different elastomers.

The ratio of the melt strength of the modified blend to the melt strength of the blend before modification is greater than 2. The ratio of melt strength is calculated by dividing the melt strength of the example by the melt strength of the corresponding control sample. The measurements for modulus, tensile strength, and elongation show that the modification of the current invention does not adversely affect the physical properties of the blend. Control 3 illustrates that keeping the radical concentration to very low levels is important in polypropylene branching, since a high radical concentration favors crosslinking of elastomers, but degradation of polypropylene. Control 3 also illustrates that elastomer crosslinking by itself was not sufficient to increase the total melt strength, despite the high value of crosslinked gel in this sample.

FIG. 1 is a graphical depiction of the mechanical loss factor (tangent-delta) as a function of the in-phase shear modulus (G'), or storage modulus, for Example 2 and Control 2, measured at constant shear rate (approximately 14 sec$^{-1}$) obtained by variable strain and frequency at a temperature of 160° C. in the melt state. The storage modulus decreases with increasing strain, but much less so with the modified material. FIG. 1 illustrates that the modification of the current invention improves the elasticity of the sample, especially with increasing strain. Such an improvement in elasticity translates into improved processing characteristics of the material where high stress or strain levels are encountered, such as reduced sag during profile or sheet extrusion, higher speed calendering, or reduced sag and improved draw during thermoforming of thermoplastic sheet.

FIG. 2 is a graphical depiction of the stress relaxation exhibited by the invention, as measured with the RPA-2000 device. The measurement was performed by recording the torque on a slab of material sheared to 100% strain at 160° C. in the melt state. The shear modulus is proportional to the measured torque. The invention reduced the rate of stress relaxation and increased the plateau shear modulus.

Figure 3:
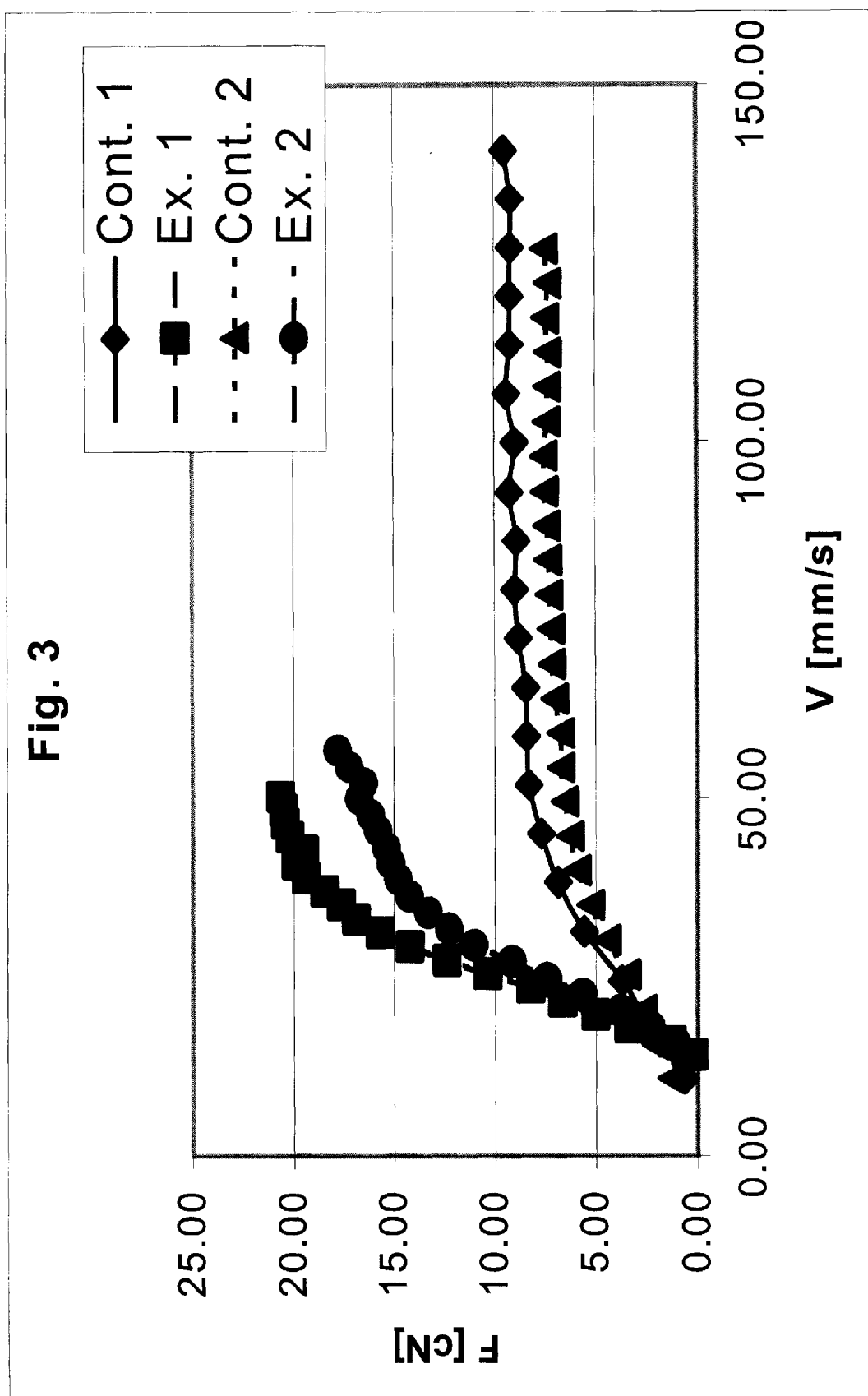
FIG. 3 is a graphical depiction of the tensile force of Examples 1–2 and Controls 1–2 as a function of wheel velocity for the rotating rollers on the Gottfert™ Rheotens Melt Tension Instrument Model 71.97, measured at 200° C.

FIG. 3 is a graphical depiction of the tensile force of Examples 1–2 and Controls 1–2 as a function of wheel velocity for the rotating rollers on the Gottfert™ Rheotens Melt Tension Instrument Model 71.97, measured at 200° C. The invention increases the force required to elongate the molten strand of material. Test conditions are those described in the text.

TABLE I

| Experiment | Ex. 1 | Ex. 2 | Ex. 3 | Ex. 4 | Cont. 1 | Cont. 2 | Cont. 3 |
|---|---|---|---|---|---|---|---|
| PP-1, wt % | 40 | — | 40 | 40 | 40 | — | — |
| PP-2, wt % | — | 40 | — | — | — | 40 | 42 |
| Elastomer-1, wt % | 30 | 30 | 60 | — | 30 | 30 | 29 |
| Elastomer-3, wt % | 30 | 30 | — | 60 | 30 | 30 | 29 |
| Extender Oil, pph | 12 | 12 | 12 | 12 | 12 | 12 | 22 |
| TMPTA, pph | 1.4 | 1.4 | 1.5 | 1.5 | — | — | 1.3 |
| Peroxide-1, pph | 0.01 | 0.01 | 0.01 | 0.01 | — | — | — |
| Peroxide-2, pph | — | — | — | — | — | — | 0.2 |
| 100% Modulus, MPa | 7.6 | 8.9 | 7.8 | 7.9 | 8.5 | 9.9 | 9.9 |
| UTS, MPa | 11.3 | 11.3 | 11.3 | 11.4 | 10.8 | 12.3 | 13.9 |
| Ult. Elong. % | 660 | 600 | 600 | 610 | 530 | 623 | 730 |
| Gel content | 53 | 60 | 63 | 62 | 0.0 | 0.0 | 84 |
| MFR, 10 kg, 230° C., dg/min | <0.1 | <0.1 | <0.1 | <0.1 | 8.0 | 18.8 | 30 |
| Melt Tension [cN]$^1$ | 21 | 18 | 19 | 18 | 10 | 8 | 4.6 |
| Melt Strength Ratio | 2.1 | 2.2 | — | — | — | — | — |

$^1$The melt strength was measured at 200° C.

Table II illustrates that the current invention can be used on base olefinic TPEs irrespective of the initial melt strength of the blend before modification. The melt strength was improved more than 1.5 times by the modification according to the invention.

TABLE II

| Experiment | Ex. 5 | Ex. 6 | Ex. 7 | Cont. 4 | Cont. 5 | Cont. 6 |
|---|---|---|---|---|---|---|
| PP-2, wt % | 26 | 30 | 26 | 26 | 31 | 26 |
| Elastomer-1, wt % | — | 33 | — | — | 32 | — |
| Elastomer-2, wt % | 74 | — | — | 74 | — | — |
| Elastomer-4, wt % | — | 37 | 74 | — | 37 | 74 |
| Extender Oil, pph | 44 | — | 44 | 44 | — | 44 |
| TMPTA, pph | 1.5 | 0.5 | 1.5 | — | — | — |
| Peroxide-1, pph | 0.015 | 0.01 | 0.015 | — | — | — |
| Hardness, Shore A | 70 | 90 | 75 | 77 | 89 | 75 |
| UTS, MPa | 5.2 | 13.9 | 7.7 | 5.5 | 13.2 | 7.6 |
| Ult. Elong. % | 660 | 430 | 450 | 840 | 400 | 830 |
| MFR, 10 kg, 230° C., dg/min | 6.2 | 0.3 | 2.4 | 110 | 0.4 | 158 |
| Gel content, % | 64 | — | 92 | 0.0 | 0.0 | 0.0 |
| Melt Tension [cN]$^1$ | 7.0 | 35.7 | 13.8 | 3.9 | 22.8 | 3.2 |
| Melt Strength Ratio | 1.8 | 1.6 | 4.3 | — | — | — |

TABLE II-continued

| Experiment | Ex. 5 | Ex. 6 | Ex. 7 | Cont. 4 | Cont. 5 | Cont. 6 |
|---|---|---|---|---|---|---|

[1]The melt strength was measured at 180° C.

Table III illustrates suitable multifunctional monomers according to the invention. The results also indicate that both gel content and melt flow rate must be optimized to achieve improvement in the overall melt strength. Even the presence of peroxide in Control 8 failed to initiate elastomer crosslinking, showing that low levels of peroxide were insufficient. The peroxide was believed to be acting only as an accelerator for the multifunctional monomer and not as an initiator for elastomer crosslinking in the current invention.

TABLE III

| Experiment | Ex. 1 | Cont. 7 | Cont. 8 |
|---|---|---|---|
| PP-1, wt % | 40 | 40 | 40 |
| Elastomer-1, wt % | 30 | 30 | 30 |
| Elastomer-3, wt % | 30 | 30 | 30 |
| Extender Oil, pph | 12 | 12 | 12 |
| TMPTA, pph | 1.4 | — | — |
| TAC, pph | — | 1.4 | — |
| TMPTMA, pph | — | — | 1.4 |
| Peroxide-1, pph | 0.01 | 0.01 | 0.01 |
| 100% Modulus, MPa | 7.6 | 8.3 | 8.3 |
| UTS, MPa | 11.3 | 10.8 | 10.3 |
| Ult. Elong. % | 660 | 610 | 590 |
| Gel content | 53 | 16 | 0.0 |
| MFR, 10 kg, 230° C., dg/min | <0.1 | 8.9 | 18.9 |
| Melt Tension [cN][1] | 21 | 13 | 10.4 |
| Melt Strength Ratio | 2.1 | 1.3 | 1.0 |

[1]The melt strength was measured at 200° C.

The results of the recycle extrusion testing are shown in Table IV. Example 1 samples were tested on a 34 mm co-rotating twin screw extruder with high shear screw design normally used for polypropylene/elastomer mixing. Melt flow index was tested at 230° C./10 kg and capillary viscosity was tested at 190° C. with 20×1 mm of L/D.

TABLE IV

| Example 1 | Pass 0 | Pass 1 | Pass 2 | Pass 3 | Pass 4 | Pass 5 | Pass 6 | Pass 7 |
|---|---|---|---|---|---|---|---|---|
| MFR, 10 kg, 230° C., dg/min | 3.7 | 3.8 | 4.0 | 4.3 | 4.5 | 4.6 | 4.7 | 5.1 |
| % Change | — | −3% | −5% | −13% | −18% | −21% | −24% | −34% |
| Viscosity, 100 sec$^{-1}$, Pa-sec | 4,860 | 4,370 | 4,450 | 4,160 | 4,020 | 3,950 | 3,950 | 3,950 |
| % Change | — | −10% | 2% | −5% | −8% | −10% | −10% | −10% |

It is to be understood that the invention is not to be limited to the exact configuration as illustrated and described herein. Accordingly, all expedient modifications readily attainable by one of ordinary skill in the art from the disclosure set forth herein, or by routine experimentation therefrom, are deemed to be within the spirit and scope of the invention as defined by the appended claims.

What is claimed is:

1. A thermoplastic elastomer composition comprising a modified blend of a propylenic resin, an ethylenic elastomer, and a multifunctional acrylic monomer that does not contain a methacrylate group comprising at least three acrylate groups, or a reaction product thereof, with the ethylenic elastomer being present in an amount by weight that is greater than that of the propylenic resin and wherein (a) the propylenic resin is at least partially branched, (b) the ethylenic elastomer is at least partially crosslinked to a gel content of at least about 25%, or (a) and (b), the modified blend having:

a ratio of the melt strength of the modified blend to the melt strength of an unmodified blend of a propylenic resin that is not branched and an ethylenic elastomer that is not crosslinked of about 1.5 to 15 measured at a temperature of at least about 180° C.;

a melt flow rate of less than about 1 dg/min measured at 230° C. under a 2.16 kg load;

a melt flow rate of less than about 5 dg/min measured at 230° C. under a 10 kg load; and a hardness of less than about 95 Shore A or less than about 45 Shore D.

2. The composition of claim 1, wherein the ratio of the melt strength of the modified blend to the melt strength of the blend before modification is about 1.6 to 12 measured at a temperature of at least about 180° C.

3. The composition of claim 1, wherein the reaction of the propylenic resin, the ethylenic elastomer, and the multifunctional acrylic monomer is initiated by heat activation at a temperature of about 200° C. to 250° C.

4. The composition of claim 1, wherein the reaction of the propylenic resin, the ethylenic elastomer, and the multifunctional acrylic monomer is initiated by a free radical initiator present in an amount less than about 0.3 pph.

5. The composition of claim 4, wherein the free radical initiator has a decomposition half-life of greater than about one hour at 120° C.

6. The composition of claim 1, wherein the modified blend comprises about 5 weight percent to up to less than 50 weight percent propylenic resin and greater than 50 weight percent to about 95 weight percent of the ethylenic elastomer.

7. The composition of claim 1, wherein the modified blend comprises about 15 weight percent to 48 weight percent propylenic resin and about 52 weight percent to 85 weight percent of the ethylenic monomer.

8. The composition of claim 1, wherein the propylenic resin comprises at least about 60 mole percent propylene monomer and the ethylenic elastomer comprises at least 60 mole percent ethylene monomer.

9. The composition of claim 1, wherein the ethylenic elastomer has a Mooney viscosity of at least about 15, a weight average molecular weight of greater than about 80,000, and a polydispersity of greater than about 1.5.

10. The composition of claim 1, wherein the ethylenic elastomer has a density of less than 0.94 g/cm$^3$.

11. The composition of claim 1, wherein the multifunctional acrylic monomer is present in an amount of about 0.1 pph to 5 pph of the polymers and has no more than seven acrylate groups.

12. The composition of claim 4, wherein the multifunctional acrylic monomer comprises trimethylolpropane triacrylate (TMPTA), ethoxylated trimethylolpropane triacrylate, propoxylated glycerol triacrylate, pentaerythritol triacrylate, bistrimethylolpropane tetraacrylate, pentaerythritol tetraacrylate, ethoxylated pentaerythritol tetraacrylate, ethoxylated pentaerythritol triacrylate, or combinations thereof.

13. The composition of claim 1, wherein the propylenic resin comprises a homopolymer of propylene or a copolymer of propylene and at least one monomer comprising $C_2$ to $C_{20}$ alpha-olefins, unsaturated organic acids, vinyl esters, aromatic vinyl compounds, vinylsilanes and unconjugated aliphatic and monocyclic diolefins, alicyclic diolefins which have an endocyclic bridge, conjugated aliphatic diolefins, and combinations thereof; and wherein the ethylenic elastomer comprises a copolymer of ethylene and at least one monomer comprising $C_3$ to $C_{20}$ alpha-olefins, unsaturated organic acids, vinyl esters, aromatic vinyl compounds, vinylsilanes and unconjugated aliphatic and monocyclic diolefins, alicyclic diolefins which have an endocyclic bridge and conjugated aliphatic diolefins or terpolymers of at least 60 mole percent of ethylene, a $C_3$ to $C_{20}$ alpha-olefin, a nonconjugated diene monomer, or combinations thereof.

14. The composition of claim 1, further comprising one or more thermal stabilizers, ultraviolet stabilizers, flame retardants, mineral fillers, extender or process oils, conductive fillers, nucleating agents, plasticizers, impact modifiers, colorants, mold release agents, lubricants, antistatic agents, and pigments.

15. The composition of claim 1 prepared by the process of melt blending the propylenic resin, the ethylenic elastomer, and the multifunctional acrylic monomer while initiating the reaction of each with at least one of heat activation or a free radical initiator.

16. An article comprising the composition of claim 1, which is formed by extrusion, thermoforming, blow molding, foam processing, or calendering.

17. The article of claim 16 in the form of an automobile component.

18. The composition of claim 1, wherein the composition comprises about 25 to 45 weight percent propylenic resin, about 58 to 78 weight percent total ethylenic elastomer, a peroxide, a triacrylate, and a paraffinic oil.

19. A method for preparing the thermoplastic elastomer composition of claim 1 comprising:

combining a propylenic resin that is at least partially branched, an ethylenic elastomer that is at least partially crosslinked, and a multifunctional acrylic monomer in the presence of an optional free radical initiator, to form a polymer mixture;

melt blending the polymer mixture at a temperature above the melt point of the propylenic resin and below about 180° C. for about 5 to 20 seconds; and mixing the polymer mixture at a temperature of about 160° C. to 250° C. for at least about 10 to 100 seconds to provide a modified polymer blend as the thermoplastic elastomer composition.

20. The thermoplastic elastomer composition of claim 1 further comprising a styrenic elastomer.

21. The composition of claim 4, wherein the free radical initiator is present in an amount of about 0.015 pph or less.

* * * * *